US012626896B2

(12) United States Patent
Yamaguchi

(10) Patent No.: US 12,626,896 B2
(45) Date of Patent: May 12, 2026

(54) MASS SPECTROMETRY DATA ANALYSIS METHOD AND IMAGING MASS SPECTROMETER

(71) Applicant: Shimadzu Corporation, Kyoto (JP)

(72) Inventor: Shinichi Yamaguchi, Kyoto (JP)

(73) Assignee: SHIMADZU CORPORATION, Kyoto-shi (JP)

( * ) Notice: Subject to any disclaimer, the term of this patent is extended or adjusted under 35 U.S.C. 154(b) by 413 days.

(21) Appl. No.: 18/570,388

(22) PCT Filed: Sep. 6, 2021

(86) PCT No.: PCT/JP2021/032582
§ 371 (c)(1),
(2) Date: Dec. 14, 2023

(87) PCT Pub. No.: WO2023/032181
PCT Pub. Date: Mar. 9, 2023

(65) Prior Publication Data

US 2024/0282561 A1 Aug. 22, 2024

(51) Int. Cl.
*G01N 27/62* (2021.01)
*H01J 49/00* (2006.01)

(52) U.S. Cl.
CPC ...... *H01J 49/0036* (2013.01); *H01J 49/0004* (2013.01)

(58) Field of Classification Search
CPC ... H01J 49/0036; H01J 49/0004; G01N 27/62
USPC ........................... 705/1.1–912; 250/281, 282
See application file for complete search history.

(56) References Cited

U.S. PATENT DOCUMENTS

2011/0228970 A1 9/2011 Kajihara et al.

FOREIGN PATENT DOCUMENTS

JP 2011-191222 B 11/2013
WO 2015/053039 A1 4/2015
WO WO-2019229900 A1 * 12/2019 .......... H01J 49/0004

OTHER PUBLICATIONS

English Translation of WO-2019229900-A1 (Year: 2019).*
Written Opinion dated Nov. 22, 2021 for PCT application PCT/JP2021/032582.

* cited by examiner

*Primary Examiner* — Jonathan P Ouellette
(74) *Attorney, Agent, or Firm* — Muir Patent Law, PLLC

(57) ABSTRACT

An imaging mass spectrometer according to the present invention includes: a measurement unit to acquire data by performing mass spectrometry on each of a plurality of micro regions in a measurement region on a sample; a narrowing unit to perform a process of narrowing a peak width with respect to each peak detected in each of a plurality of profile spectra based on the data individually obtained in the plurality of micro regions to be averaged or summed; a spectrum calculation unit to obtain an overall mass spectrum by averaging or summing the plurality of mass spectra processed by the narrowing unit; a peak selection reception unit to display the overall mass spectrum and receive an instruction from a user to select a peak on the mass spectrum; and an image creation unit to create a mass spectrometry image corresponding to the peak received by the peak selection reception unit.

6 Claims, 5 Drawing Sheets

Fig. 3C
Fig. 3B
Fig. 3A
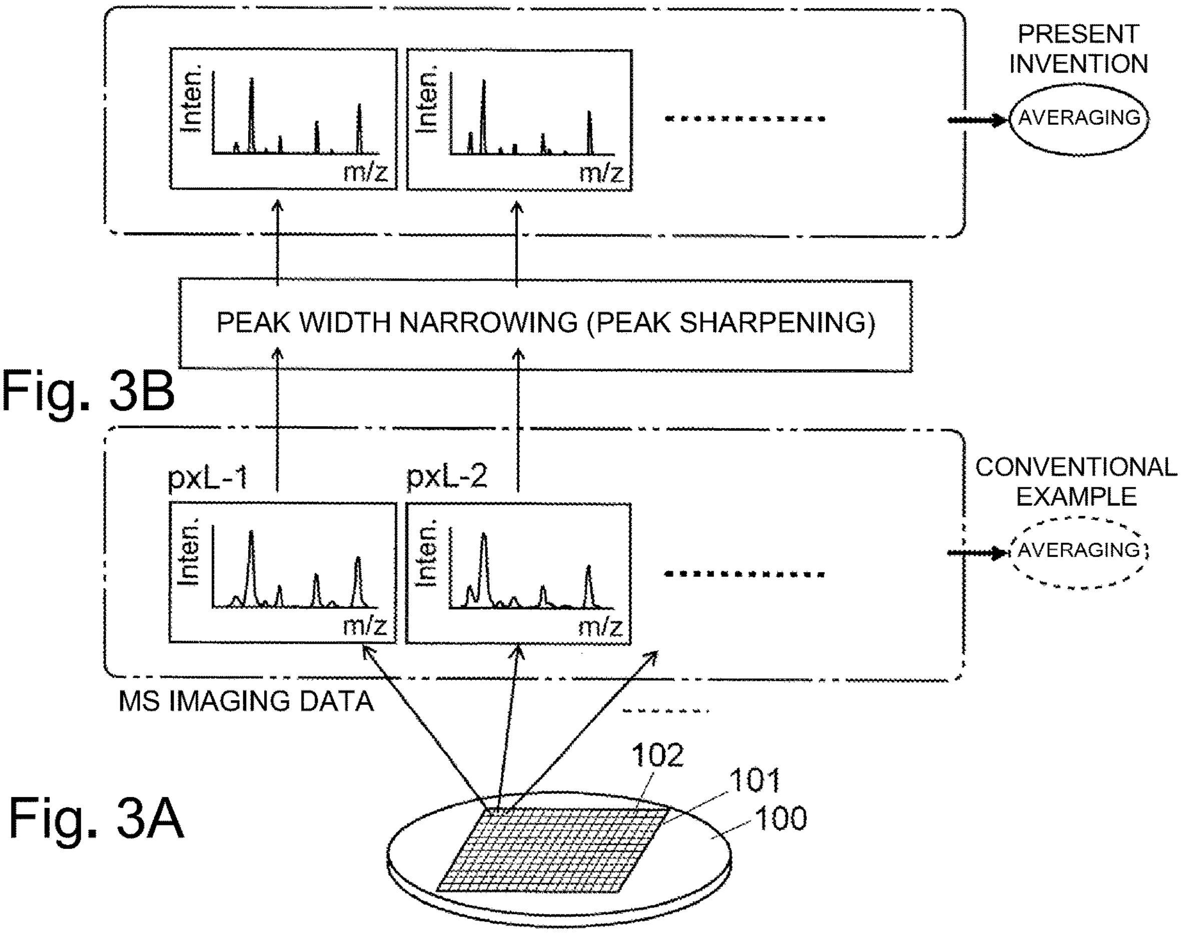
Fig. 4
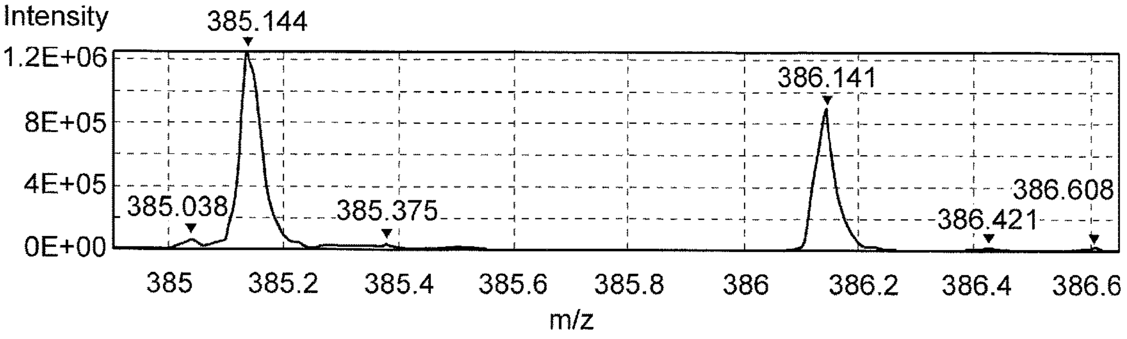

MASS SPECTROMETRY DATA ANALYSIS METHOD AND IMAGING MASS SPECTROMETER

TECHNICAL FIELD

The present invention relates to an imaging mass spectrometer and a method for analyzing data collected by the imaging mass spectrometer.

BACKGROUND ART

An imaging mass spectrometer is a device capable of visualizing a compound distribution on a sample such as a section of biological tissue. An imaging mass spectrometer disclosed in Patent Literature 1 is equipped with an ion source by a matrix assisted laser desorption/ionization (MALDI) method. The imaging mass spectrometer collects mass spectrum data over a predetermined mass-to-charge ratio (customarily referred to as "mass-to-charge ratio" or simply referred to as "m/z" in this specification although it is technically "m/z" in italics) range for each of micro regions created by finely segmenting a two-dimensional measurement region on a sample.

Another method of imaging mass spectrometryis is also known in which mass spectrum data is acquired for each micro region by cutting out a sample piece from each micro region in a measurement region by use of a sampling method called laser microdissection, and a liquid sample prepared from each sample piece is analyzed in a mass spectrometer (see Patent Literature 2). Here, a device using such a sampling method is also included in the "imaging mass spectrometer".

In any case, the imaging mass spectrometer can obtain an image showing a distribution of, for example, a specific compound by extracting a signal intensity value at an m/z value of an ion derived from the specific compound, from mass spectrum data obtained for each micro region on a sample, and creating an image in which the signal intensity value is disposed according to a two-dimensional position of each micro region on the sample. Hereinafter, this image is referred to as mass spectrometry (MS) image.

In a typical imaging mass spectrometer, in a case in which a compound to be observed, that is, a target compound is already determined, a user specifies an m/z value corresponding to the compound. Then, an MS image at the m/z value is created and displayed on a screen.

On the other hand, in a case in which the target compound is not specified, a user designates an appropriate peak while viewing an acquired mass spectrum. Then, the imaging mass spectrometer creates an MS image corresponding to the m/z value of the designated peak and displays the MS image on the screen.

In such a case, as described in Patent Literature 1, an average mass spectrum created by averaging a plurality of mass spectra obtained in all micro regions in a measurement region or a sum mass spectrum obtained by simply summing the plurality of mass spectra is often used as the mass spectrum for the user to select the peak. This is because it is considered that the average mass spectrum or the sum mass spectrum usually contains information about all compounds present in the measurement region.

CITATION LIST

Patent Literature

Patent Literature 1: JP 2011-191222 A
Patent Literature 2: WO 2015/053039 A

SUMMARY OF INVENTION

Technical Problem

However, the analysis method in the conventional imaging mass spectrometer has the following problems.

The above average mass spectrum is obtained by averaging so-called profile spectra each of which is created on the basis of raw data obtained by mass spectrometry on a micro region in the measurement region. The width of a peak observed in a profile spectrum depends on the mass resolution of a mass spectrometer used for measurement.

Although a time-of-flight mass spectrometer (TOFMS) widely used in the imaging mass spectrometer generally has high mass accuracy, a typical TOFMS in many cases cannot completely separate peaks derived from different compounds having masses very close to each other by its mass resolution.

A Fourier transform mass spectrometer, on the other hand, generally has a very high mass resolution. However, in a case in which a sample contains a large number of compounds having masses very close to each other, it is difficult to sufficiently separate peaks of such compounds.

When an average mass spectrum is created from such a plurality of profile spectra having poor separability, peaks having m/z values close to each other often overlap to form substantially one peak. The m/z value obtained from such a peak is often different from any of the m/z values corresponding to the plurality of overlapping compounds. That is, information (masses and signal intensities) of different compounds which have been recognized by different peaks in the profile spectra may be lost by averaging or summing the mass spectra at a portion in the measurement region.

Even in a case where the mass resolution is high to some extent, a peak in a profile spectrum may have a large skirt. Therefore, when a difference in m/z value between a peak observed in a profile spectrum A for a certain micro region and a peak observed in a profile spectrum B for another micro region is small and a signal intensity difference between these peaks is large, the peak having a smaller signal intensity may be hidden under the skirt of the peak having a larger signal intensity by averaging or summing the mass spectra.

For the reasons described above, an m/z value of a peak observed in the average mass spectrum or the sum mass spectrum often deviates from an m/z value corresponding to a compound actually contained in the sample. In addition, a peak derived from a compound locally contained in a trace amount on the sample often cannot be observed in the average mass spectrum or the sum mass spectrum. Therefore, when a peak appearing in the average mass spectrum or in the sum mass spectrum is selected and an MS image at the specific m/z value is displayed, there is a possibility that the distribution of the compound to be observed by the user becomes inaccurate, or an important compound locally present in the measurement region is overlooked.

The present invention has been made to solve such problems, and an object of the present invention is to provide a mass spectrometry data analysis method and an imaging mass spectrometer capable of displaying an MS image of an m/z value accurately corresponding to a compound present in a measurement region.

Another object of the present invention is to provide a mass spectrometry data analysis method and an imaging mass spectrometer capable of displaying an MS image by grasping the presence of a compound locally present in a measurement region without overlooking the compound.

Solution to Problem

One mode of a mass spectrometry data analysis method according to the present invention, which is aimed at solving the aforementioned problems, is a mass spectrometry data analysis method of analyzing data obtained by performing mass spectrometry on each of a plurality of micro regions in a measurement region on a sample, the mass spectrometry data analysis method including:

- a narrowing step of performing a process of narrowing a peak width with respect to each peak detected in each of a plurality of profile spectra individually obtained in the plurality of micro regions to be averaged or summed;
- a spectrum calculation step of obtaining an overall mass spectrum by averaging or summing the plurality of mass spectra subjected to the narrowing;
- a peak selection reception step of displaying the overall mass spectrum and receiving an instruction from a user to select a peak on the mass spectrum; and
- an image creation step of creating a mass spectrometry image corresponding to the peak selected in the instruction.

One mode of an imaging mass spectrometer according to the present invention, which is aimed at solving the aforementioned problems, includes:

- a measurement unit configured to acquire data by performing mass spectrometry on each of a plurality of micro regions in a measurement region on a sample;
- a narrowing unit configured to perform a process of narrowing a peak width with respect to each peak detected in each of a plurality of profile spectra based on the data individually obtained in the plurality of micro regions to be averaged or summed;
- a spectrum calculation unit configured to obtain an overall mass spectrum by averaging or summed the plurality of mass spectra processed by the narrowing unit;
- a peak selection reception unit configured to display the overall mass spectrum and receive an instruction from a user to select a peak on the mass spectrum; and
- an image creation unit configured to create a mass spectrometry image corresponding to the peak received by the peak selection reception unit.

Advantageous Effects of Invention

The narrowing of the peak width herein means that the peak width after the processing is smaller than that before the processing, and the peak width after the processing may be substantially zero.

In accordance with the mass spectrometry data analysis method and the imaging mass spectrometer according to the above mode of the present invention, it is possible to display a mass spectrum in which peaks having m/z values accurately corresponding to masses of a plurality of compounds present in the measurement region on the sample are observed while utilizing the mass accuracy of a mass spectrometer used for measurement. As a result, a highly accurate distribution image corresponding to each of the plurality of compounds can be observed. It is also possible to check a distribution image of a compound locally present in a trace amount in a narrow range in the measurement region without overlooking the presence of the compound. In this way, the present invention can perform distribution analysis of compounds more finely and accurately than before.

BRIEF DESCRIPTION OF DRAWINGS

FIGS. 3A-3C are an explanatory diagram of a difference between an average mass spectrum creation process in the imaging mass spectrometer of the present embodiment and a conventional average mass spectrum creation process.

FIG. 4 is a diagram illustrating an example of an actually-measured profile spectrum.

DESCRIPTION OF EMBODIMENTS

Hereinafter, an embodiment of an imaging mass spectrometer and a mass spectrometry data analysis method according to the present invention will be described with reference to the accompanying drawings.

Figure 1:
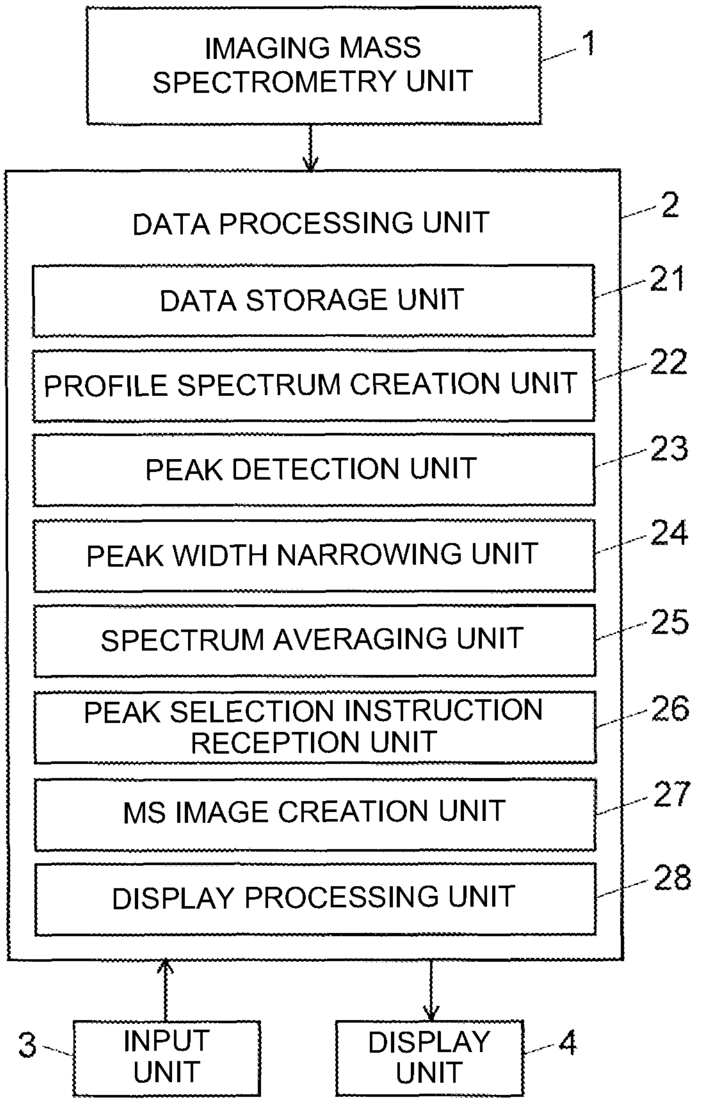
FIG. 1 is a schematic configuration diagram of an imaging mass spectrometer according to an embodiment of the present invention.

FIG. 1 is a schematic configuration diagram of the imaging mass spectrometer of the present embodiment.

The imaging mass spectrometer of the present embodiment includes an imaging mass spectrometry unit 1, a data processing unit 2, an input unit 3, and a display unit 4.

The imaging mass spectrometry unit 1 is a device using, for example, an air pressure MALDI ion trap time-of-flight mass spectrometer (APMALDI-IT-TOFMS). However, the imaging mass spectrometry unit 1 may be a device obtained by combining a laser microdissection device and a mass spectrometer which performs mass spectrometry of a sample prepared from a minute sample piece collected from a sample by the laser microdissection device as disclosed in Patent Literature 2. An ion source is not limited to an air pressure MALDI ion source. A mass separator is not limited to a time-of-flight mass separator. It is preferable to obtain high mass accuracy, and a Fourier transform mass separator or the like can be used in addition to the time-of-flight mass separator.

The data processing unit 2 includes, as functional blocks, a data storage unit 21, a profile spectrum creation unit 22, a peak detection unit 23, a peak width narrowing unit 24, a spectrum averaging unit 25, a peak selection instruction reception unit 26, an MS image creation unit 27, a display processing unit 28, and the like.

In the imaging mass spectrometer of the present embodiment, the data processing unit 2 usually mainly includes a personal computer or a higher-performance workstation. The data processing unit 2 can embody the functional blocks by executing, on the computer, a dedicated data processing software application installed in the computer. In this case, the input unit 3 is a keyboard or a pointing device (such as a mouse) attached to the computer, and the display unit 4 is a display monitor.

Next, a procedure example of a data analysis process in the imaging mass spectrometer of the present embodiment will be described with reference to FIGS. 2 and 3.

Figure 2:
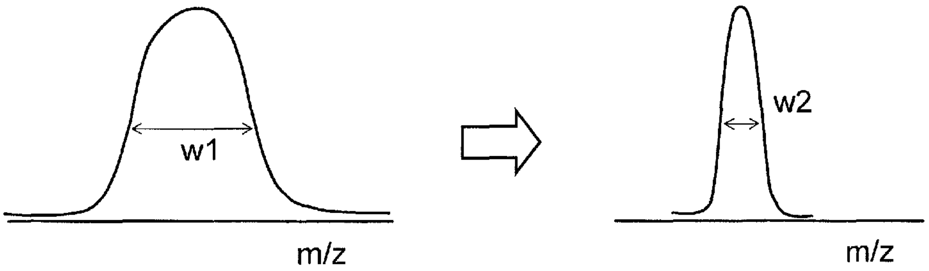
FIG. 2 is a conceptual diagram of an example of a peak width narrowing process in the imaging mass spectrometer of the present embodiment.

FIG. 2 is a conceptual diagram of an example of a peak width narrowing process. FIGS. 3A-3C are an explanatory diagram of a difference between an average mass spectrum creation process in the imaging mass spectrometer of the present embodiment and a conventional average mass spectrum creation process.

An object to be measured by the imaging mass spectrometry unit 1 is, for example, a slice sample obtained by thinly slicing a biological tissue such as a brain or an internal organ of a laboratory animal. The sample is placed on a sample plate. A matrix for MALDI is applied to a surface of the sample. The sample is set at a predetermined position of the imaging mass spectrometry unit 1.

The imaging mass spectrometry unit 1 executes mass spectrometry on each of micro regions 102 created by finely segmenting a predetermined measurement region 101 on a sample 100 in a grid pattern as shown in FIG. 3A, and acquires mass spectrum data over a predetermined m/z range.

Specifically, the ion source irradiates one micro region 102 with a laser beam for a short time to generate ions derived from compounds present in the micro region 102. The ions are temporarily introduced into the ion trap, and then sent to the time-of-flight mass separator, whereby the ions are separated and detected according to their m/z values. By repeating the spectrometry operation while moving the sample 100 or the ion source so that an irradiation position with the laser beam moves on the sample 100, the mass spectrum data is collected for all the micro regions 102 set in the measurement region 101.

Product ion spectrum data may be acquired by performing MS/MS analysis in which ions having a specific m/z value or included in a specific m/z range are analyzed by being dissociated by collision-induced dissociation or the like, or $MS^n$ analysis in which n is 3 or more, instead of the normal mass spectrometry.

The mass spectrum data in the micro regions collected as described above, that is, MS imaging data for the entire measurement region 101 is transferred from the imaging mass spectrometry unit 1 to the data processing unit 2 and stored in the data storage unit 21. The data at this time is raw data obtained by the mass spectrometry, but may be data subjected to appropriate waveform processing such as noise removal.

When a user gives an analysis execution instruction from the input unit 3 in a state in which the data storage unit 21 stores the MS imaging data of the entire measurement region 101 as described above, the data processing unit 2 performs the following processing.

The profile spectrum creation unit 22 sequentially reads the data corresponding to the micro regions from the data storage unit 21 to create profile spectra. As shown in FIG. 3B, the profile spectra have a continuous waveform in an m/z-axis direction, and a peak corresponding to a compound is observed as a mountain-like peak. A conventional imaging mass spectrometer obtains an average mass spectrum for the measurement region 101 by averaging the plurality of profile spectra obtained for all the micro regions 102 in the measurement region 101 as shown on the right side of FIG. 3B.

In contrast, in the imaging mass spectrometer of the present embodiment, the peak detection unit 23 detects a peak in each profile spectrum in accordance with a predetermined criterion. Next, as shown in FIG. 2, the peak width narrowing unit 24 executes a process of narrowing a width of each detected peak, in other words, a sharpening process of narrowing the peak while maintaining a signal intensity of a peak top. As the peak narrowing process, various known methods for peak sharpening can be used. Specifically, peaks can be sharpened using, for example, wavelet transform processing, Fourier transform processing, or differential processing.

In general, in the TOFMS, the mass accuracy of the peak is sufficiently (usually by one order of magnitude or more) higher as compared to the peak width. The peak having high mass accuracy as described above causes no practical problem even when the peak width is reduced to the same level as the mass accuracy. Specifically, the peak width can be reduced to ⅓ or less, for example, about 1/10. Some mass spectrometers such as an ion trap mass spectrometer have low mass accuracy, and a mass deviation may be larger than the peak width. In such a case, it is not preferable to narrow the peak width. This is because narrowing the peak width is likely to cause an increase in deviation between an m/z value obtained from the peak and a true (theoretical) m/z value.

As shown in FIG. 3C, the spectrum averaging unit 25 calculates one average mass spectrum as an overall mass spectrum by executing a process of averaging all the profile spectra in which the peak width narrowing process has been completed. Of course, the peak width narrowing process and the profile spectrum averaging process can be performed in parallel. That is, the peak width narrowing process may be performed first, and the profile spectra may be summed sequentially from the profile spectrum in which the narrowing process has been completed, and may be averaged finally. Alternatively, a sum mass spectrum obtained by summing all the profile spectra in which the peak width narrowing process has been completed may be calculated instead of the average mass spectrum.

Reducing the peak width of each peak in the profile spectra as described above makes it possible to reduce a possibility that a plurality of peaks having m/z values very close to each other are combined and become inseparable at the time of averaging (or summing) the profile spectra. Even in case of combination of a plurality of peaks having very close m/z values, it is highly likely that a deviation between m/z values of peak tops due to the combination can be reduced. When the peak width is narrowed, the peak has a smaller skirt. Thus, even in a case in which a peak having a small signal intensity and a peak having a large signal intensity are close to each other, it is possible to prevent the peak having a small signal intensity from being hidden under the skirt of the peak having a large signal intensity.

The peak selection instruction reception unit 26 displays, on a screen of the display unit 4, the average mass spectrum having favorable peak separability created as described above. The user checks the average mass spectrum, and selects a desired peak on the average mass spectrum, for example, by designating the desired peak with the input unit 3. The peak selection instruction reception unit 26 recognizes the designated peak and determines an m/z value associated with the peak, usually an m/z value at a peak top position.

The MS image creation unit 27 acquires a signal intensity value corresponding to the determined m/z value in each micro region, and creates an MS image. The display processing unit 28 displays the created MS image on the screen of the display unit 4. For example, the MS image may be displayed in the same screen as the average mass spectrum, and when the user changes the designated peak on the average mass spectrum, the displayed MS image can be updated in response to the designation change (change in the designated m/z value).

As described above, the imaging mass spectrometer of the present embodiment observes ion peaks derived from various compounds present all over or locally in the measurement region 101, the ion peaks being separated from each other without overlapping in the average mass spectrum. This enables the user to appropriately select the peak corresponding to each compound on the average mass spectrum, and check the MS image showing a distribution of the compound with high accuracy.

Instead of graphically designating the peak observed in the average mass spectrum, a list of m/z values of peaks observed in the average mass spectrum may be displayed so that the user can select an m/z value to be observed in the list.

Next, a modification of the imaging mass spectrometer of the above embodiment will be described with reference to FIGS. 4 to 7.

This modification differs from the above description in the processing of the peak width narrowing unit 24 and the spectrum averaging unit 25 in the configuration of the imaging mass spectrometer shown in FIG. 1. This difference will be described below.

FIG. 4 is an example of a profile spectrum corresponding to one micro region created by the profile spectrum creation unit 22. As described above, a mountain-like peak is observed in the profile spectrum. The peak detection unit 23 detects a peak in the profile spectrum corresponding to each micro region in accordance with a predetermined criterion.

Figure 5:
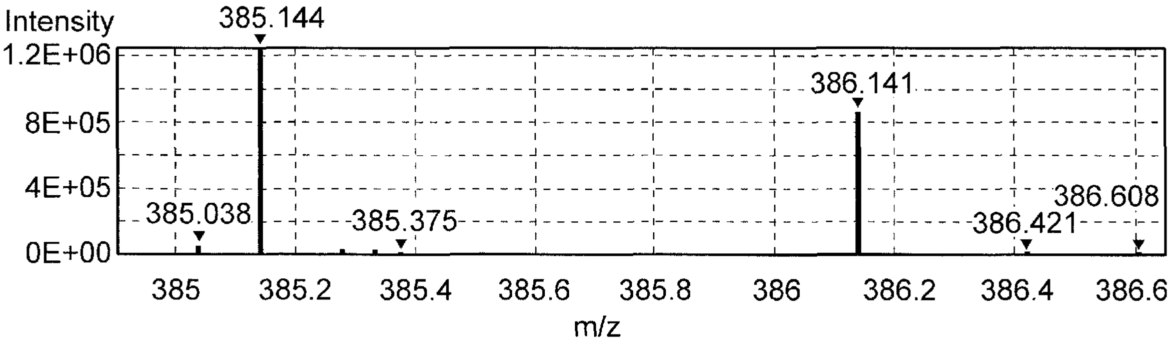
FIG. 5 is a diagram illustrating an example of a centroid spectrum obtained by centroiding the profile spectrum shown in FIG. 4.

Next, the peak width narrowing unit 24 centroids each detected peak. As is well known, centroiding is a process of calculating a barycentric position (m/z value) of the mountain-like peak, replacing the original mountain-like peak with a bar-like peak (centroid peak) whose width is substantially zero and height is a peak area value, and disposing the bar-like peak at the barycentric position. In a centroid-displayed mass spectrum (that is, a centroid spectrum), each centroid peak is indicated by a line having a predetermined width. In principle, the peak width of the centroid peak is zero (infinitely small), and the peak has no skirt. FIG. 5 is a mass spectrum in which each peak detected in the actually-measured profile spectrum shown in FIG. 4 is centroided, that is, a centroid spectrum.

Subsequently, the spectrum averaging unit 25 averages centroid spectra corresponding to all the micro regions 102 included in the measurement region 101 to calculate an average mass spectrum. However, since the peak width of the centroid peak is substantially zero as described above, the following binning process is executed at the time of averaging.

Figure 6:
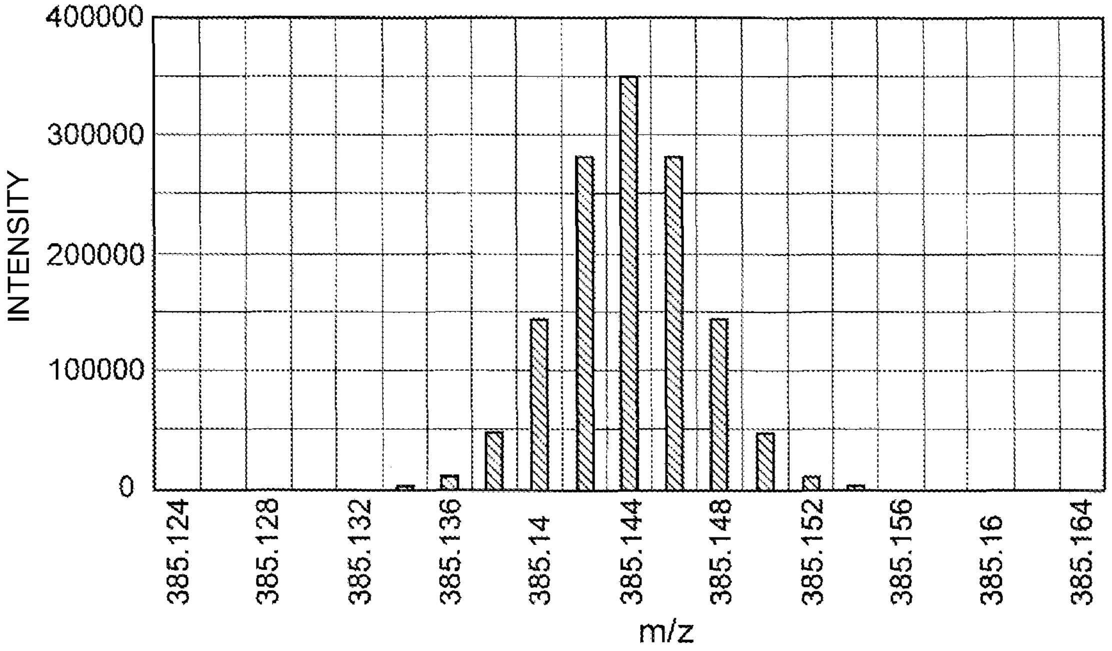
FIG. 6 is a diagram illustrating an example of a binning process at the time of averaging centroid peaks.

First, bins are created by dividing the m/z axis by a bin width having a sufficient mass resolution. As a guide of the bin width, the bin width can be set to the same level as the mass accuracy of the mass spectrometer used for measurement. The peaks in all the centroid spectra are assigned to any one of the bins according to their m/z values. That is, it is determined to which bin in the m/z range each centroid peak belongs. Signal intensities of all the centroid peaks assigned to one bin are summed and averaged in each bin. Such processing forms a bar graph in which the m/z axis is divided by each bin as shown in FIG. 6. In this example, the bin width is 0.002 Da, but the bin width is not limited thereto.

Figure 7:
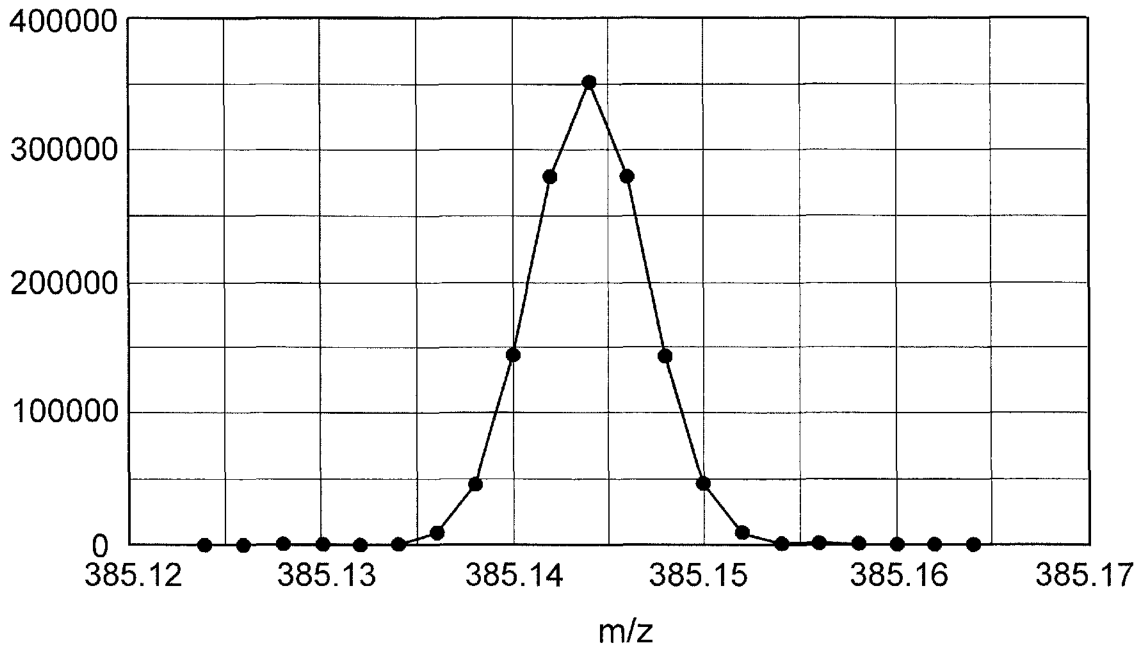
FIG. 7 is a diagram illustrating an example of a pseudo profile spectrum based on the binning process result shown in FIG. 6.

The spectrum averaging unit 25 creates a pseudo profile spectrum having a continuous waveform on the m/z axis as shown in FIG. 7 from the thus-obtained bar graph. The spectrum averaging unit 25 creates the average mass spectrum by performing the peak detection process again on the pseudo profile spectrum to obtain a peak, and further centroiding the peak if necessary. The thus-obtained average mass spectrum may be displayed on the display unit 4 so that a peak selection instruction from the user is received.

Figure 9:
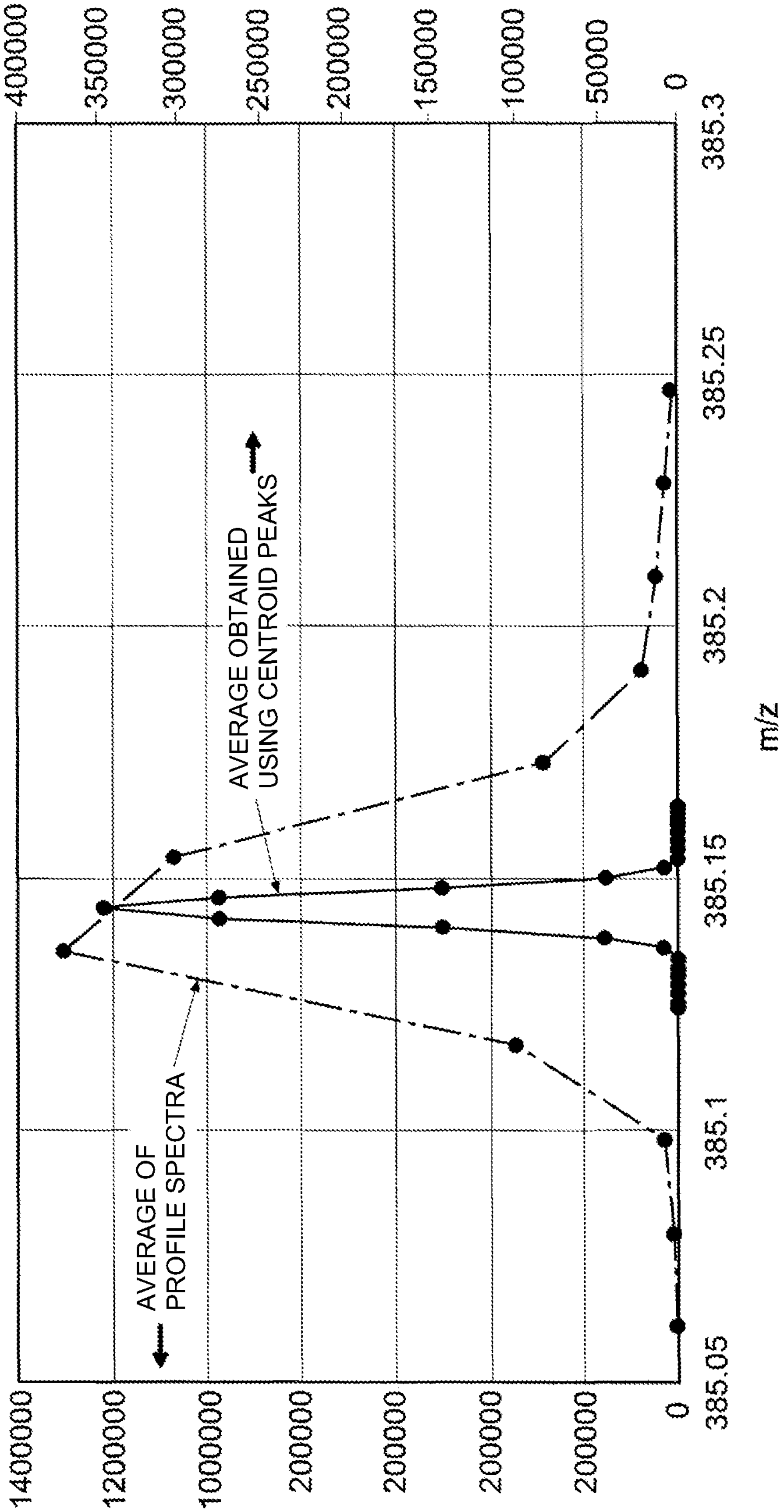
FIG. 9 is a diagram illustrating an example of comparison between a peak on an average mass spectrum obtained from profile spectra and a peak on an average mass spectrum obtained using centroid peaks.

FIG. 9 is a diagram illustrating an example of comparison between a peak (that is, a peak obtained by a conventional method) on an average mass spectrum obtained from profile spectra in which no peak narrowing process has been performed and a peak (that is, a peak obtained using an example of the present invention) on the average mass spectrum obtained using the centroid peaks described above. It can be confirmed that the peak width on the average mass spectrum is considerably narrowed by using the centroid peaks. As a result, even in a case in which a plurality of compounds having a slight difference in m/z value are present in the measurement region 101, it is possible to prevent peaks corresponding to these compounds from being combined on the average mass spectrum, and it is possible to give an instruction to select individual peaks corresponding to the compounds.

The following process may also be executed instead of performing the binning process on the centroid peaks as described above.

Figure 8:
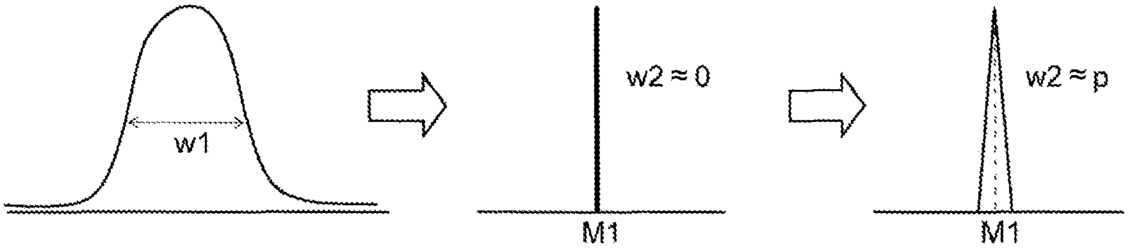
FIG. 8 is a conceptual diagram of a modification of the peak width narrowing process in the imaging mass spectrometer of the present embodiment.

As shown in FIG. 8, the peak width narrowing unit 24 centroids each peak detected in the profile spectrum to acquire the centroid peak. As described above, a peak width w2 of the centroid peak is substantially zero. A position (m/z M1) of the centroid peak is a barycentric position of the peak on the original profile spectrum.

Next, the peak width narrowing unit 24 gives, to each centroid peak, a peak width obtained by multiplying a peak width w1 of the peak before centroiding (the peak on the profile spectrum) by a predetermined coefficient, and forms a peak having an appropriate shape, for example, an isosceles triangle shape or a rectangular shape. A value of the coefficient by which the peak width w1 is to be multiplied can be appropriately determined in consideration of the mass accuracy of the mass spectrometer and the like, and may be, for example, in a range of about 0.05 to 0.3, for example, 0.1. As a result, each peak is converted into a peak having a small (or substantially no) skirt while having an appropriate peak width. The average mass spectrum can be obtained by collecting all the profile spectra corresponding to the micro regions thus obtained and averaging the profile spectra. This is similar to the peak width narrowing process described above, but the peak position may move because the peaks are once centroided.

In the imaging mass spectrometer of the embodiment and the modification described above, the imaging mass spectrometry uses the time-of-flight mass separator as a mass separator. However, the imaging mass spectrometry unit 1 is not limited to the time-of-flight mass separator, and may use a mass separator having a mass resolution equal to or higher than that of the time-of-flight mass separator. Specifically, in addition to various TOFMSs, a Fourier transform mass spectrometer using a Fourier transform ion cyclotron resonance mass separator, an Orbitrap mass separator, or the like is useful.

In addition, instead of performing mass spectrometry while sequentially scanning the micro regions 102 set in the measurement region 101 on the sample 100, the imaging mass spectrometry unit 1 may perform stigmatic (or projection-type) imaging mass spectrometry for simultaneously performing mass spectrometry on a large number of micro regions in parallel. Furthermore, the imaging mass spectrometry unit 1 may physically cut out a minute sample piece from each of the micro regions 102 in the measurement region 101 by a method such as laser microdissection, and perform mass spectrometry on a liquid sample prepared from each sample piece to acquire data. That is, the measurement method may be any method as long as the mass spectrum data in a predetermined m/z range in each micro region 102 in the measurement region 101 can be obtained.

In addition, the embodiment and the modification described above are merely examples of the present invention, and it is a matter of course that modifications, corrections, additions, and the like appropriately made within the scope of the gist of the present invention are included in the claims of the present application.

Various Modes

It will be understood by those skilled in the art that the exemplary embodiment described above is a specific example of the following modes.

(Clause 1) One mode of a mass spectrometry data analysis method according to the present invention is a mass spectrometry data analysis method of analyzing data obtained by performing mass spectrometry on each of a plurality of micro regions in a measurement region on a sample, the mass spectrometry data analysis method including:

- a narrowing step of performing a process of narrowing a peak width with respect to each peak detected in each of a plurality of profile spectra individually obtained in the plurality of micro regions to be averaged or summed;
- a spectrum calculation step of obtaining an overall mass spectrum by averaging or summing the plurality of mass spectra subjected to the narrowing;
- a peak selection reception step of displaying the overall mass spectrum and receiving an instruction from a user to select a peak on the mass spectrum; and
- an image creation step of creating a mass spectrometry image corresponding to the peak selected in the instruction.

(Clause 6) One mode of an imaging mass spectrometer according to the present invention includes:

- a measurement unit configured to acquire data by performing mass spectrometry on each of a plurality of micro regions in a measurement region on a sample;
- a narrowing unit configured to perform a process of narrowing a peak width with respect to each peak detected in each of a plurality of profile spectra based on the data individually obtained in the plurality of micro regions to be averaged or summed;
- a spectrum calculation unit configured to obtain an overall mass spectrum by averaging or summing the plurality of mass spectra processed by the narrowing unit;
- a peak selection reception unit configured to display the overall mass spectrum and receive an instruction from a user to select a peak on the mass spectrum; and
- an image creation unit configured to create a mass spectrometry image corresponding to the peak received by the peak selection reception unit.

According to the mass spectrometry data analysis method described in clause 1 and the imaging mass spectrometer described in clause 6, it is possible to display a mass spectrum in which peaks having m/z values accurately corresponding to masses of a plurality of compounds present in the measurement region are observed while utilizing high mass accuracy of a mass spectrometer used for measurement. As a result, a highly accurate distribution image corresponding to each of the plurality of compounds can be observed. It is also possible to check a distribution image of a compound locally present in a narrow range in the measurement region without overlooking the presence of the compound. In this way, the present invention can perform distribution analysis of compounds more finely and accurately than before.

(Clause 2) In the mass spectrometry data analysis method according to clause 1, the narrowing step may include centroiding the peak detected in the profile spectrum.

Centroiding is a process of converting a mountain-like peak into a line peak, and is a kind of narrowing process. However, a peak width of the centroided peak is substantially zero.

(Clause 3) In the mass spectrometry data analysis method according to clause 2, the narrowing step may include performing a process of widening a width of the peak obtained by centroiding.

Here, in the "process of widening a width of the peak", the peak width may be widened according to the peak width of the peak before being centroided. For example, a peak width obtained by multiplying the peak width of the peak before being centroided by a predetermined coefficient of less than 1 may be given to the centroided peak.

According to the mass spectrometry data analysis method described in clause 3, it is possible to create an overall mass spectrum having high separability of adjacent peaks by relatively simple data processing.

(Clause 4) In the mass spectrometry data analysis method according to clause 2, the spectrum calculation step may include obtaining the overall mass spectrum from a discrete spectrum obtained by binning the peak obtained by centroiding according to a mass-to-charge ratio of the peak in all the plurality of micro regions to be averaged or summed, and aggregating an intensity of the peak assigned to each bin.

According to the mass spectrometry data analysis method described in clause 4, it is possible to create an overall mass spectrum having high separability of adjacent peaks almost independently of the peak width of the peak on the original profile spectrum, that is, without being affected a lot by the peak width even when there is a peak having a relatively large peak width.

(Clause 5) In the mass spectrometry data analysis method according to any one of clauses 1 to 4, the data may be data obtained by time-of-flight mass spectrometry or Fourier transform mass spectrometry.

As described above, in a case in which the mass accuracy of the mass spectrometer used for measurement is lower as compared to the width of the observed peak, narrowing the peak width on the basis of a peak shape may cause an increase in deviation between an m/z value obtained from the peak and a true (theoretical) m/z value, leading to a deterioration of the accuracy of the mass spectrum. In contrast, the time-of-flight mass spectrometer and the Fourier transform mass spectrometer generally have considerably high mass accuracy, and have a smaller mass error as compared to the width of the observed peak. Consequently, the effects of the present invention as described above can be sufficiently exhibited.

REFERENCE SIGNS LIST

1 . . . Imaging Mass Spectrometry Unit
2 . . . Data Processing Unit
21 . . . Data Storage Unit
22 . . . Profile Spectrum Creation Unit
23 . . . Peak Detection Unit
24 . . . Peak Width Narrowing Unit
25 . . . Spectrum Averaging Unit
26 . . . Peak Selection Instruction Reception Unit
27 . . . MS Image Creation Unit
28 . . . Display Processing Unit
3 . . . Input Unit
4 . . . Display Unit
100 . . . Sample
101 . . . Measurement Region
102 . . . Micro Region

The invention claimed is:

1. A mass spectrometry data analysis method of analyzing data obtained by performing mass spectrometry on each of a plurality of micro regions in a measurement region on a sample, the mass spectrometry data analysis method comprising:

a narrowing step of performing a process of narrowing a peak width with respect to each peak detected in each of a plurality of profile spectra individually obtained in the plurality of micro regions to be averaged or summed;

a spectrum calculation step of obtaining an overall mass spectrum by averaging or summing the plurality of profile spectra subjected to the narrowing;

a peak selection reception step of displaying the overall mass spectrum and receiving an instruction from a user to select a peak on the mass spectrum; and an image creation step of creating a mass spectrometry image corresponding to the peak selected in the instruction.

2. The mass spectrometry data analysis method according to claim 1, wherein the narrowing step includes centroiding the peak detected in the profile spectrum.

3. The mass spectrometry data analysis method according to claim 2, wherein the narrowing step includes performing a process of widening a width of the peak obtained by centroiding.

4. The mass spectrometry data analysis method according to claim 2, wherein the spectrum calculation step includes obtaining the overall mass spectrum from a discrete spectrum obtained by binning the peak obtained by centroiding according to a mass-to-charge ratio of the peak in all the plurality of micro regions to be averaged or summed, and aggregating an intensity of the peak assigned to each bin.

5. The mass spectrometry data analysis method according to claim 1, wherein the data is data obtained by time-of-flight mass spectrometry or Fourier transform mass spectrometry.

6. An imaging mass spectrometer comprising:

a measurement unit configured to acquire data by performing mass spectrometry on each of a plurality of micro regions in a measurement region on a sample;

a narrowing unit configured to perform a process of narrowing a peak width with respect to each peak detected in each of a plurality of profile spectra based on the data individually obtained in the plurality of micro regions to be averaged or summed;

a spectrum calculation unit configured to obtain an overall mass spectrum by averaging or summing the plurality of profile spectra processed by the narrowing unit;

a peak selection reception unit configured to display the overall mass spectrum and receive an instruction from a user to select a peak on the mass spectrum; and an image creation unit configured to create a mass spectrometry image corresponding to the peak received by the peak selection reception unit.

* * * * *